United States Patent [19]

Iu

[11] Patent Number: 5,442,407
[45] Date of Patent: Aug. 15, 1995

[54] VIDEO SIGNAL NOISE REDUCTION SYSTEM USING TIME-VARYING FILTER COEFFICIENTS

[75] Inventor: Siu-Leong Iu, Bensalem, Pa.

[73] Assignee: Matsushita Electric Corporation of America, Secaucus, N.J.

[21] Appl. No.: 215,683

[22] Filed: Mar. 22, 1994

[51] Int. Cl.$^6$ ............................................. H04N 5/213
[52] U.S. Cl. .................... 348/620; 348/616; 348/416; 348/420
[58] Field of Search ............... 348/616, 617, 619, 618, 348/620, 621, 415, 416, 420, 421; H04N 5/213

[56] References Cited

U.S. PATENT DOCUMENTS

| | | | |
|---|---|---|---|
| 4,296,436 | 10/1981 | Achida | 348/620 |
| 4,361,853 | 11/1982 | Remy et al. | 348/616 |
| 4,658,285 | 4/1987 | Lewis, Jr. | 358/36 |
| 4,737,850 | 4/1988 | Lu et al. | 358/167 |
| 4,864,394 | 9/1989 | Gillard | 348/416 |
| 5,161,018 | 11/1992 | Matsunaga | 348/620 |
| 5,247,363 | 9/1993 | Sun et al. | 348/616 |
| 5,282,031 | 1/1994 | Kim | 348/420 |
| 5,329,317 | 7/1994 | Maimpally et al. | 348/620 |
| 5,337,086 | 8/1994 | Fujinami | 348/420 |
| 5,374,958 | 12/1994 | Yanagihara | 348/421 |

OTHER PUBLICATIONS

S. L. Iu, "Noise Reduction using Multi-Frame Motion Estimation, with Outlier Rejection and Trajectory Correction", IEEE *ICASSP-93*, pp. V205–V208 (Apr. 1993).

T. A. Reinen, "Noise Reduction in Heart Movies by Motion Compensated Filtering", *SPIE Visual Communications and Image Processing '91: Image Processing*, vol. 1606, pp. 755–763 (1991).

E. Dubois, "Noise Reduction in Image Using Motion-Compensated Temporal Filtering", *IEEE Transactions on Communications*, vol. COM-32, No. 7, pp. 826–831 (Jul. 1984).

*Primary Examiner*—James J. Groody
*Assistant Examiner*—Jeffrey S. Murrell
*Attorney, Agent, or Firm*—Ratner & Prestia

[57] ABSTRACT

A video signal noise reduction system is disclosed in which corresponding image pixels from a current frame and image pixels from a noise reduced previous frame are averaged to produce respective noise reduced pixel values. In the disclosed exemplary embodiment of the invention, a processed frame memory stores a noise reduced image and a motion estimator identifies a target block of pixels in this processed frame memory to be used in calculating a noise reduced video signal. A motion compensated noise reduction processor combines the block of the noise reduced image pixels stored in the processed frame memory with a current block of pixels generated from the video signal to produce a motion block of noise reduced pixels. The relative weighting applied to the stored pixel and the current pixel depends on the number of pixels that were used to generate the stored pixel. A breakdown detector discards pixels in the motion block if a measure of noise reduction achieved for the one component divided by a measure of noise in the motion block is greater than a threshold value. Sparkle reduction is used to replace any original component of the motion block with its corresponding noise reduced component if all of the components adjacent to the original component have been replaced by their corresponding noise reduced components.

13 Claims, 6 Drawing Sheets

VIDEO SIGNAL NOISE REDUCTION SYSTEM USING TIME-VARYING FILTER COEFFICIENTS

FIELD OF THE INVENTION

The present invention relates to noise reduction in general and specifically to the reduction of noise in video signals. In particular, a method and apparatus are disclosed for reducing noise in a video signal by averaging video information over several frame intervals using motion compensated noise filtering with time-varying weighting coefficients.

BACKGROUND OF THE INVENTION

Noise reduction (NR) in image sequences can improve both image quality and performance of subsequent video coding. This is so because noise in image sequences adds spurious uncorrelated image components which are visually offensive and which may reduce the effectiveness of any compression scheme which relies on image correlations from frame to frame.

As set forth in a book by J. S. Lim, entitled *Two Dimensional Signal and Image Processing*, Prentice Hall, 1990, pages 568 et seq., one simple method for performing temporal filtering is through frame averaging. Frame averaging is very effective in processing a sequence of image frames which are contaminated by random noise but in which there is not much change in image information from frame to frame.

As is well known in the art, there are many different ways of performing freune averaging. Although frame averaging may be very simple and effective, precise signal registration from frame to frame is essential for success. In practical applications such as motion pictures and television, the image may change from frame to frame. Parts of the image may move by translation or rotation, by changing in size or by combinations of the above. In some prior-art systems, frame averaging is only applied to still areas of an image, that is to say, to those areas which do not exhibit motion from frame to frame. Other prior-art systems attempt to estimate the movement of an image from one frame to the next and to compensate for this motion in applying frame averaging using respectively different parts of two frames, based on the estimated motion. In order to perform this motion-compensated image restoration, the portions of the image frames are averaged along approximate motion trajectories.

One exemplary noise reduction system is described in my paper entitled "Noise Reduction Using Multi-Frame Motion Estimation, with Outlier Rejection and Trajectory Correction," *IEEE Internatinal Conference on Acoustics, Speech and Signal Processing*, Apr. 27, 1993, pp V-205 to V-208. This paper describes a video noise reduction system in which image noise is reduced on a pixel-by-pixel basis by calculating a block motion vector and then generating a corrected trajectory for each pixel on a frame-to-frame basis to locate closely corresponding pixel values in each of a plurality of successive image frames. A noise reduced image is then generated by averaging all of the pixel values on the corrected trajectory. This paper also describes a breakdown detection and correction method which inhibits replacement of an original pixel value with a noise-reduced pixel value in certain conditions.

An alternative way of accomplishing noise reduction is disclosed by an article by T. J. Dennis entitled, "Nonlinear Temporal Filter For Television Picture Noise Reduction," *IEEE Proceedings*, Vol. 127, Pt. G, No. 2, April 1980, pages 52 et seq. Specifically, a conventional recursive interframe low pass filter for a 625 line 5.5 MHz monochrome television is modified so that any attenuation of frame differences is instantaneously dependent on the amplitude of the frame differences. Thus, the filter attenuates large area spatial interference, such as streaking, provided it does not contain zero frequency or frame frequency components. Using this method, however, some spatial degradation may occur in areas of the image which contain motion.

A further technique to accomplish noise reduction is disclosed by an article by E. Dubois et al. entitled, "Noise Reduction in Image Sequences Using Motion-Compensated Temporal Filtering," *IEEE Transactions on Communications*, Vol. COM-32, No. 7, July 1984, pages 826 et seq. In particular, the nonlinear recursive filtering approach is extended by the application of motion-compensation techniques. Furthermore, a specific noise reducer for use with NTSC composite television signals is disclosed. Unlike prior low order non-recursive filters, the nonlinear recursive filtering approach described by Dubois is able to reduce noise to a greater extent than prior art noise reduction systems. There are, however, practical limitations on the ability of the circuit to effectively reduce various types of noise.

Yet another method of image noise reduction is described in a paper by T. A. Reinen entitled "Noise Reduction in Heart Movies by Motion Compensated Filtering" *SPIE vol 1606 Visual Communications and Image Processing '91: Image Processing* July, 1991, pp 755-763. This paper describes a method of using motion compensated temporal filtering for removing noise in medical image sequences. This method employs a first order recursive filter adapts automatically to the quality of motion estimation to produce an edge preserving spatial filter.

SUMMARY OF THE INVENTION

The present invention relates to a method and apparatus for reducing noise in video applications using temporal recursive filtering. Using this method, a motion estimator is first applied to a block of pixels in a current frame to locate a block of pixels from a stored, noise reduced frame which may be used to predict the block of pixels in the current frame. These blocks of pixels are then processed by a motion compensated noise reduction processor which calculates a set of time-varying weighted filtering coefficients for the blocks and then performs noise filtering calculations by averaging the pixels in the blocks as weighted by the coefficients.

According to another aspect of the invention, a breakdown detector inhibits replacement of a motion block with an averaged block by processing the pixel values included in the averaged block to determine whether the noise reduction was effective. The averaged pixels values are discarded if the noise reduction is determined to be ineffective.

DETAILED DESCRIPTION

Figure 1:
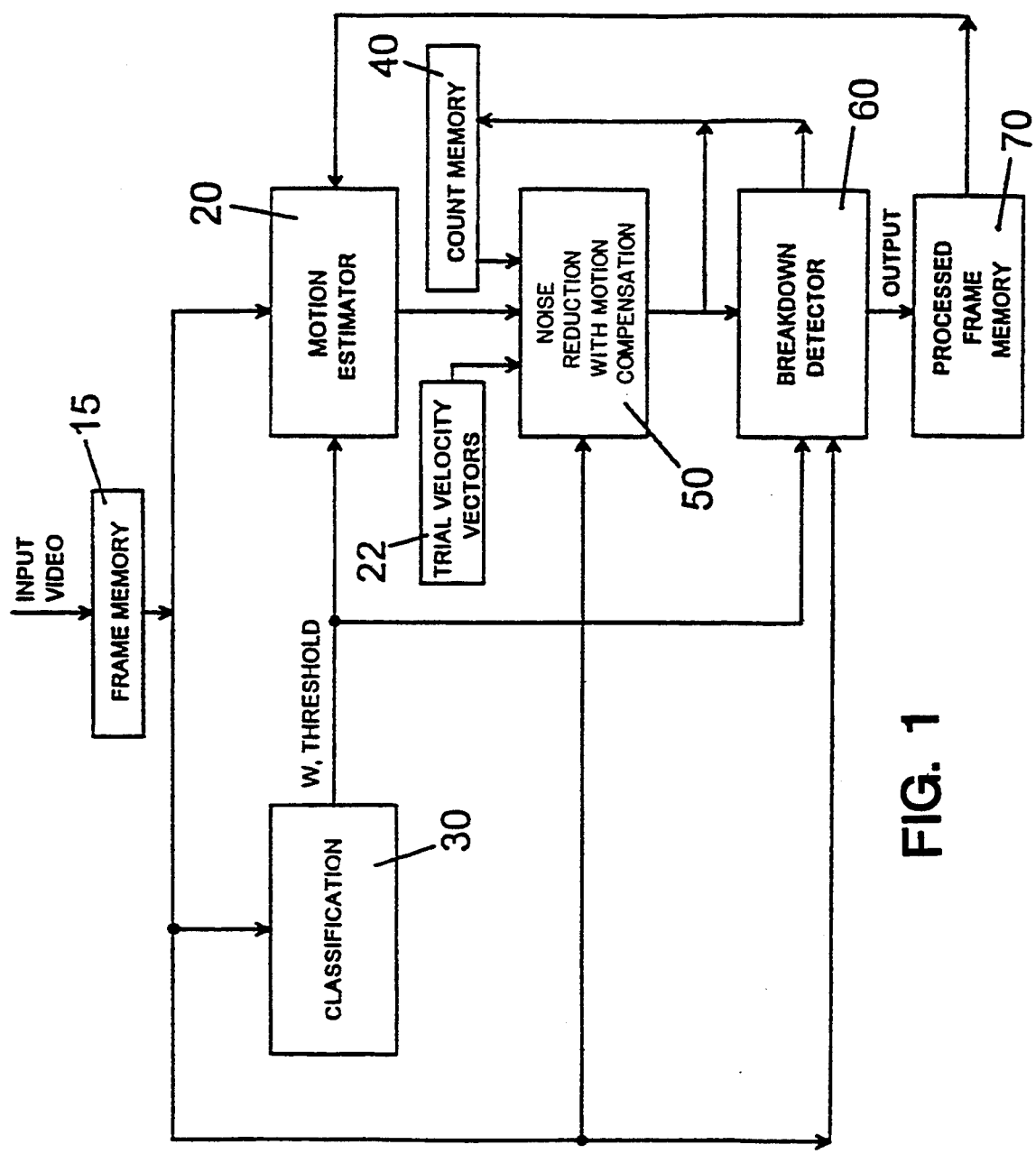
FIG. 1 is a functional block diagram of a noise reduction system in accordance with the present invention.

An exemplary embodiment of the noise reduction system is illustrated by a block diagram shown in FIG. 1. The input signal to this noise reduction system is the current frame (k) and the next frame, namely (k+1) which is to be displayed one frame interval after the current frame. A noise reduced previous frame (k−1) is also provided via a processed frame memory 70.

The invention is described in terms of an exemplary embodiment which employs a first-order recursive filter and which uses motion estimation that is based on motion blocks. It is contemplated, however, that the invention may be practiced using second- or higher order recursive filters and using other types of motion estimation. For example, pixel-based motion estimation, such as disclosed in my above-referenced article, or motion estimates generated from motion vector fields would produce good results.

In the exemplary embodiment of the invention, the frames k and k+1 are stored in respective frame memories (shown collectively as a memory 15). Only the current block from frame k is applied to the classifier 30. All three frames are applied to the block-based motion estimator 20, the motion compensated noise reduction processor 50, and the breakdown detector 60. Motion estimator 20 is provided with successive blocks of, for example, four-by-four pixels within the current frame (k). These blocks are to be used as motion blocks. The processing steps described below are for one motion block. These steps are repeated for each motion block in frame k and then the frame position advances such that the noise reduced frame k becomes frame k−1, and frame k+1 becomes frame k, and a new frame is provided as frame k+1.

In the exemplary embodiment of the invention, a count memory 40 stores a value that is used in the calculation of the noise reduced pixel value. It determines the amount of weight that is to be put on the motion compensated pixel value of forward prediction, F, in the calculation of the noise reduced pixel value. The count value represents a number of pixels that have been combined to produce a corresponding noise reduced pixel in the processed frame memory 70.

The exemplary embodiment of the invention may also average pixels from the current frame with just the pixels from a subsequent frame or with a combination of pixels from the previous frame, as stored in the memory 70, and pixels from the subsequent frame. The count values change the weights of only those pixels that are obtained from the memory 70.

The processed frame memory 70 stores the noise reduced previous frame. Its input pixel values are provided by the output of the breakdown detector 60. The pixel values stored in the memory 70 are provided to the motion estimator 20 to be used in further processing.

The classifier 30 uses edge detection to determine a measure of the variation which occurs in the current block. Briefly, the classifier 30 examines each pixel in the current block to determine a difference in magnitude between the pixel and the pixels which are adjacent to it in the block. If the difference is greater than a reference level, the pixel is marked as an edge pixel. After processing the entire block, the classifier 30 modifies the values of a weighting factor, w, and a threshold value, t, for the block, based on the number of edges in the block. Although the exemplary embodiment of the invention employs edge detection to determine a measure of variation in a block, it is contemplated that other methods may be used, for example spatially filtering the pixels in the block to determine the level of AC energy in the block.

The weighting value, w, and threshold value, t, are sent by the classifier 30 to the motion estimator 20 and the breakdown detector 60. The weighting value, w, and the threshold value, t, in general depend on the types of images being processed. They may be calculated as follows. Initial values are provided for w and t by an operator. These initial values may be determined by applying the values w and t as described below with reference to FIGS. 3 and 6, for a range of expected pixel values and modifying w and t until desired output values are obtained.

While the noise reduction system is operating, the values of w and t are modified based on the amount of variation in the current block. If the current block exhibits a large amount of variation, the value of w is relatively small and the value of t is relatively large. If the block exhibits only a small amount of variation, the value of w is relatively large and the value of t is relatively small.

Using multiple trial velocity vectors, motion estimator 20 determines whether the best motion estimate for the current block is forward (i.e., as a modification of the corresponding block from the prior frame (k−1) as determined by the current trial motion vector), backward (i.e., as a modification of the corresponding block from the next future frame (k+1) as determined by the current trial motion vector), or bidirectional (i.e., as a modification of the corresponding block from the prior frame and the next future frame as determined by the current trial motion vector).

The predictive mode is then sent to noise reduction processor 50 which uses this information and the appropriate pixels from the appropriate frames k/1, k, k=1 to calculate an averaged pixel value for the current frame.

The averaged block of pixel values is then processed by noise reduction breakdown detector 60. Breakdown detector 60 inhibits replacement of individual pixels in the current frame (k) with the calculated noise-reduced pixel if the difference between the noise-reduced pixel value and the pixel value that it is to replace is greater, by a threshold factor, t, than the median difference in the entire image frame. If this condition is detected, it is assumed to indicate that the motion estimator and motion compensated noise reduction processor improperly recognized noise in the image instead of valid image information.

Although the invention is described in terms of serial processing of image blocks, it is contemplated that the same results could be achieved by processing image blocks in parallel. For example, motion estimation for multiple image blocks could proceed in parallel and the processing steps used to generate a motion estimate for a given block may be performed in parallel for several trial motion vectors.

Figure 2:
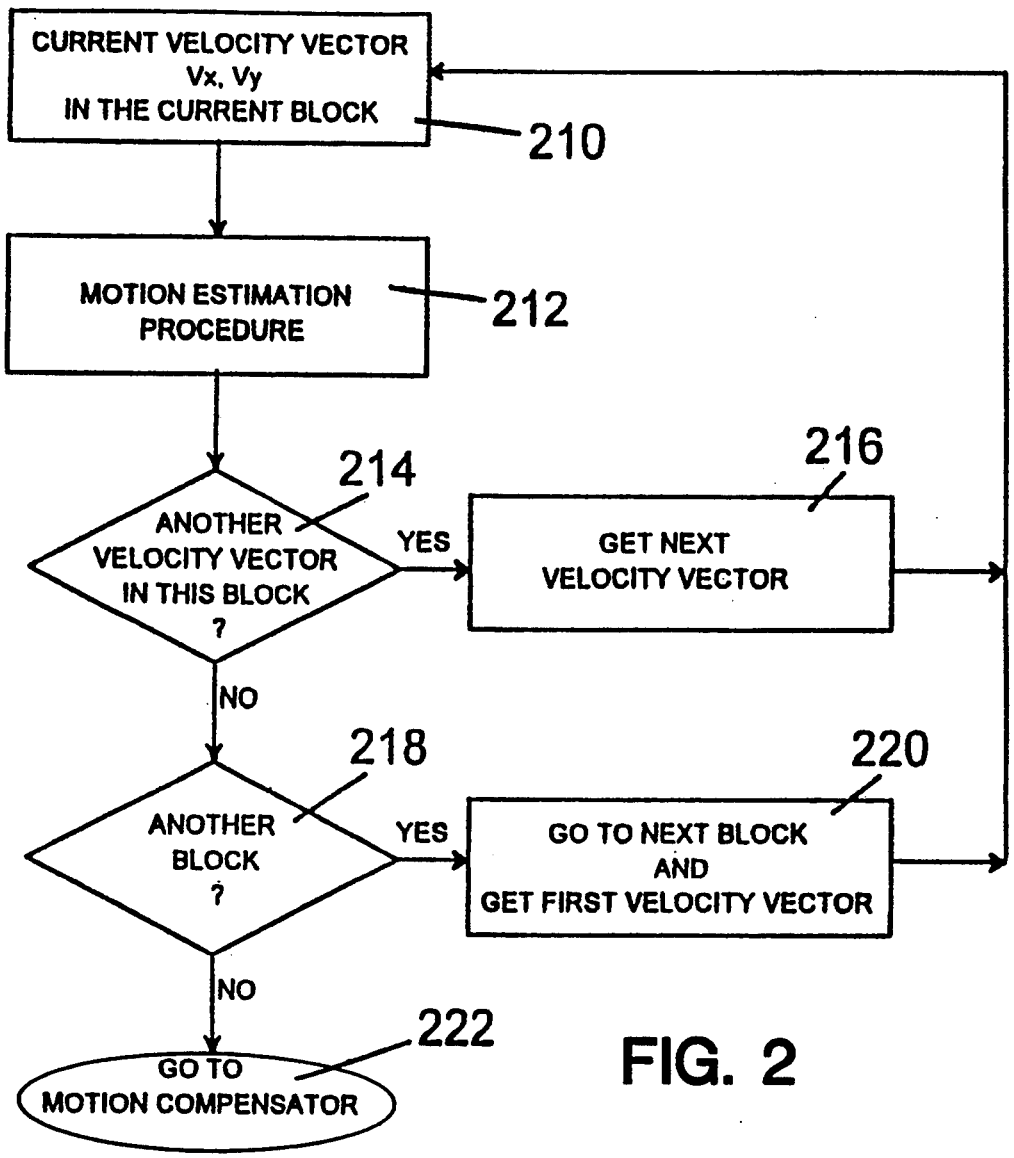
FIG. 2 is a flow diagram which illustrates the operation of the motion estimator shown in FIG. 1 as it cycles through each velocity vector in each block.

FIG. 2 illustrates the manner in which the motion estimator 20 operates by repeating its calculations for each velocity vector in each block. In the exemplary embodiment of the invention, a trial velocity vector (dx,dy) is recalled from a velocity vector memory 22 at step 210 by the motion estimator 20 for processing. Although the trial motion vectors are shown as being provided by a memory 22, it is contemplated that they may be provided by other means. For example, the motion vectors may be generated according to a preprogrammed algorithm or they may be calculated for each block, based on the position of the block in the image and the motion vectors generated for surrounding blocks.

After that velocity vector (dx,dy) has been processed, at step 212 through the motion estimation procedure, another velocity vector, at step 216, is obtained from the memory 22. This continues until the last velocity vector in the memory 22 has been processed. In the exemplary embodiment of the invention, the memory 22 may, for example, hold velocity vectors representing all possible displacements of the current block from $\frac{1}{2}$ pixel positions an integer N pixel positions in steps of one-half pixel position. Alternatively, the memory 22 may contain only a few statistically more probable motion vectors which effectively span the set of possible block motion. When the last motion vector has been processed, at step 214, then the motion estimator 20 begins processing another block in the current frame at step 220. In the exemplary embodiment of the invention, after all of the blocks in the current frame have been processed, at step 218, the processed blocks are passed, at step 222, to the motion compensated noise reduction processor 50. Alternatively, each block may be passed to the processor 50 in sequence.

Figure 3:
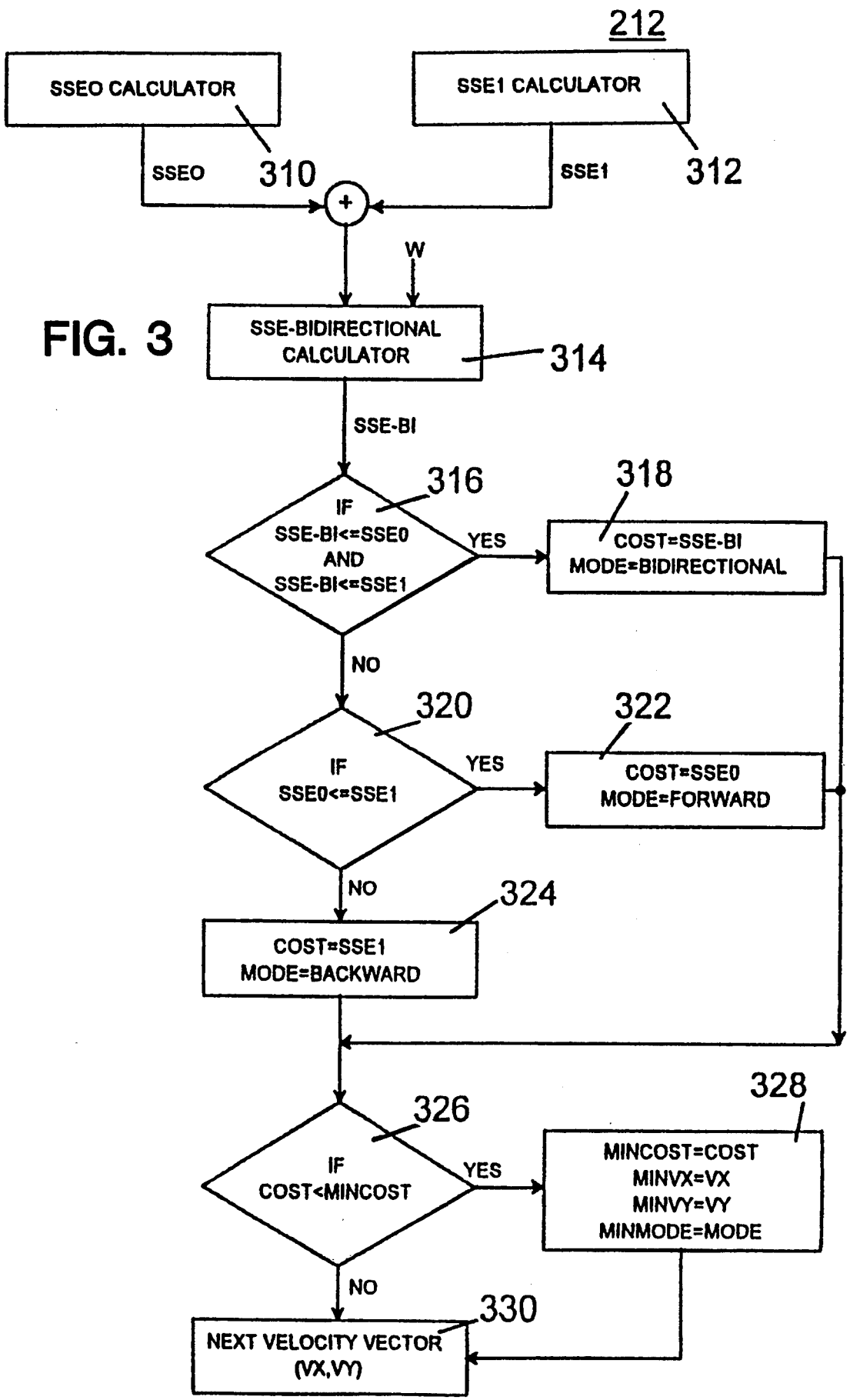
FIG. 3 is a flow diagram of a block-based motion estimator suitable for use with the system shown in FIG. 1.

FIG. 3 is a flow diagram of an exemplary block-based motion estimator 212, shown in FIG. 2. The sum of squared error (SSE) is calculated for the previous and next frames by the SSE0 calculator at step 310 and by the SSE1 calculator at step 312, respectively. As described below, each of the calculators is coupled to a respectively different one of the frame memories k−1 and k+1 (not shown) which hold the frames of video information to be used to produce the noise-reduced data for the current frame. Each calculator provides address values to its respective frame memory and receives, from the frame memory, data values which are stored at the addressed locations. Each sum of squared error calculator determines which pixels to get from its associated frame memory based upon how many pixel positions the target block in their respective frames k−1 and k+1 is displaced from the current motion block along the current velocity vector. This pixel displacement is based on the received velocity vector.

The sum of squared error values for a block of pixel values in a frame 1 (i.e., k+1 or k−1) along the trajectory defined by the applied velocity vector can also be expressed in accordance with equation (1):

$$SSE_l = \sum_{(i,j)\in M} [I_k(p_{ij}(k)) - I_l(p_{ij}(l))]^2 \quad (1)$$

where $I_1(p_{ij})$ is the intensity of the displaced frame 1 (i.e., frame k−1 or frame k+1) at pixel position $P_{ij}$, M is the set of pixel positions in the motion block, $p_{ij}(1)$ is a pixel position in frame 1 taken along the velocity vector v, relative to the corresponding pixel value $p_{ij}(k)$ from the current frame k, according to the equation (2).

$$p_{ij}(1) = p_{ij}(k) + v*f(F,B) \quad (2)$$

Each of the sum of square error calculators calculates an SSE value for its associated frame memory based on the velocity vector v, where v=(dx,dy). The factor f(F,B) is a function of the motion compensated pixel values of forward and backward predictions, F and B respectively. A simple form of this function may be f(F,B)=1−k. It is contemplated, however, that other functions may be used such as one which multiplies 1 by a weighting factor that varies based on the type of motion. Using a factor of this type, both translational and known non-translational motion may be handled accurately. It is contemplated that this weighting factor may also be changed based on relative values of motion vectors immediately surrounding the motion vector for the selected block.

SSE0 and SSE1 are summed by an adder. The sum calculated by the adder is then sent to the SSE-Bidirectional calculator 314 which, using the weighting factor, w, from the classifier 30, determines the SSE for a bidirectional prediction. In the exemplary embodiment of the invention, this bidirectional prediction, SSE-Bidirectional is given by the equation (3).

$$SSE\text{-Bidirectional} = (SSE0 + SSE1)/w \quad (3)$$

The value of w is determined by the classification processor 30 shown in FIG. 1. In general, this value is larger for blocks which exhibit a small amount of variation and smaller for blocks which exhibit a larger amount of variation.

Next, based on the values of SSE0, SSE1, and SSE-Bidirectional, the best predictive mode is determined. The value of SSE-Bidirectional is compared to the values of SSE0 and SSE1 at step 316. If the value of SSE-Bidirectional is less than or equal to both the value of SSE0 and the value of SSE1, the predictive mode is set to bidirectional at step 318. If the value of SSE-Bidirectional is greater than either the value of SSE0 or SSE1, the value of SSE0 is compared to the value of SSE1 at step 320. If the value of SSE0 is less than or equal to the value of SSE1, the predictive mode is set to forward at step 322. If the value of SSE0 is greater than the value of SSE1, the predictive mode is set to backward at step 324. Step 326 determines if the value of the sum of squared error used in conjunction with the predictive mode, COST which equals SSE-Bidirectional for bidirectional mode, SSE0 for forward mode, and SSE1 for backward mode, is less than a value, MINCOST which represents the smallest cost encountered thus far. If so, at step 328, variables MINCOST, MINVX, MINVY, and MINMODE are set to the respective current values of COST, VX, VY, and MODE. The next velocity vector is then processed at step 330. After the predictive mode has been determined and all the velocity vectors in all of the blocks have been processed, control is sent to motion compensated noise reduction processor 50.

Figure 4:
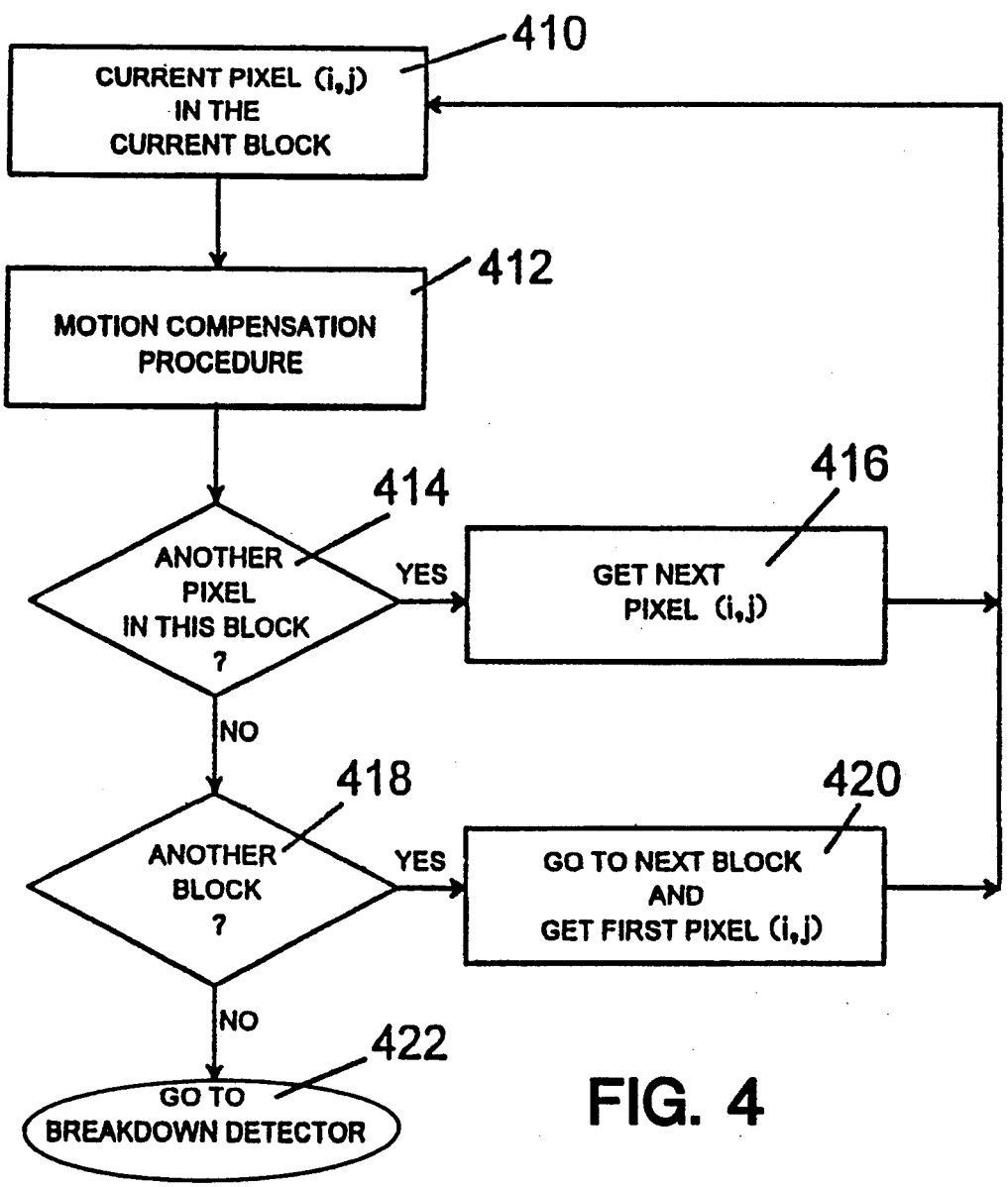
FIG. 4 is a flow diagram which illustrates the operation of the motion compensated noise reduction processor shown in FIG. 1 as it cycles through each pixel in each block.

FIG. 4 illustrates the manner in which the noise reduction processor 50 repeats its calculations for each pixel in each block. At step 410, the current pixel, p(i,j), in the current block is sent to the processor 50 for processing at step 412. After that pixel, p(i,j), has been processed, step 414 determines if another pixel in the current block is to be processed. If so, the next pixel is fetched at step 416 and control returns to step 410, described above. This continues until all of the pixels in the current block have been processed. When, at step 414, the current block does not contain another pixel, then the next block in the current frame is fetched at step 420 and control is transferred to step 410. If at step 418 the current frame does not contain another block, then control is passed, at step 422, to the breakdown detector 60 described below with reference to FIG. 6.

Figure 5:
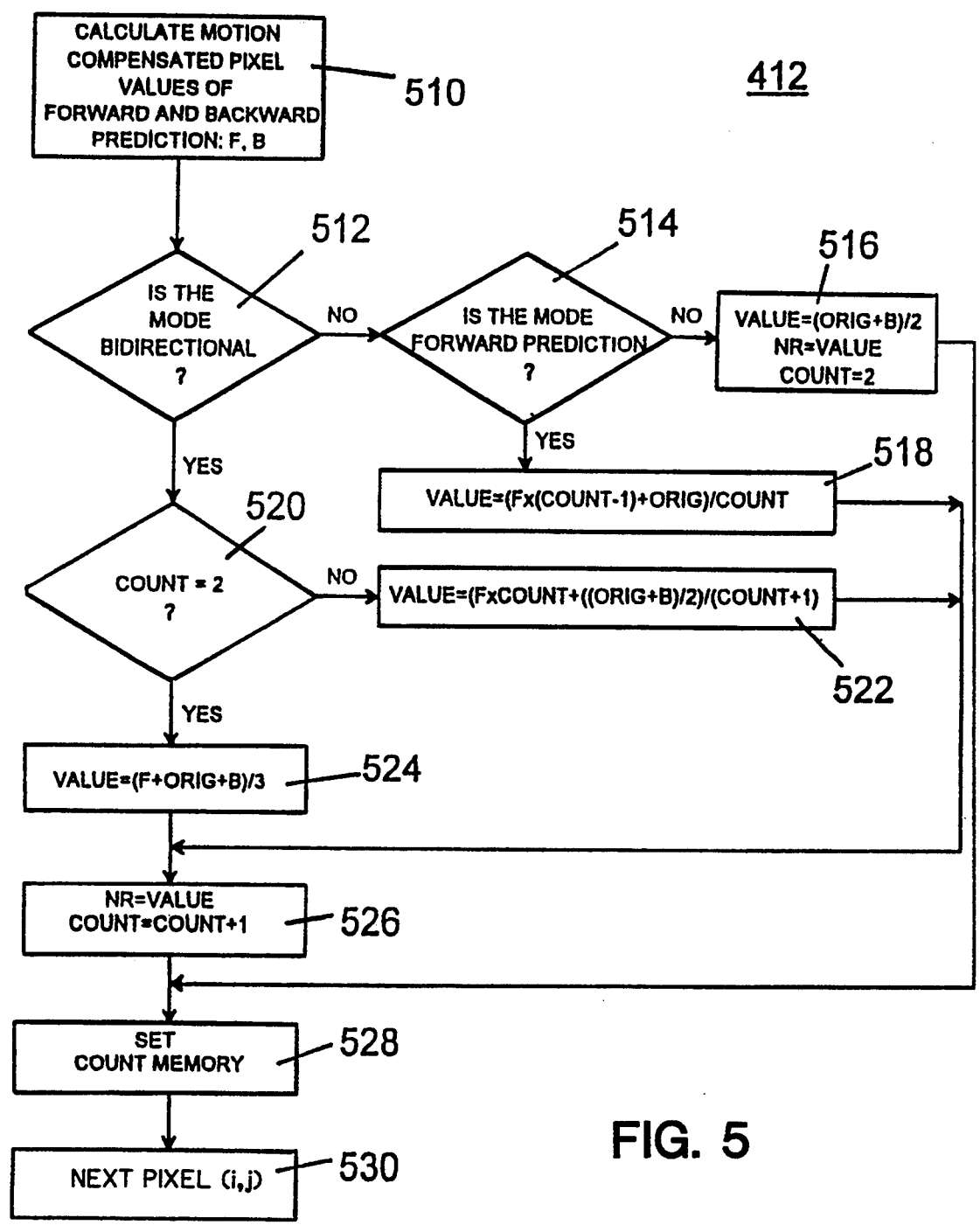
FIG. 5 is a flow diagram of a block-based motion compensated noise reduction processor suitable for use with the system shown in FIG. 1.

FIG. 5 is a flow diagram of an exemplary block-based motion compensated noise reduction processor suitable for use as the step 412 of FIG. 4. As shown in FIG. 1, count memory 40 is coupled to the noise reduction processor 50. Motion compensated pixel values of forward and backward prediction, F and B respectively, are initially calculated by calculator 510. In the alternative, the values of F and B can be passed from the motion estimator 20. The mode is then determined, at step 512, using the information passed from the motion estimator 20 and the count memory 40. If the mode is forward prediction, at step 514, the noise reduced pixel value is set by equation (4), at step 518, and the count is incremented by 1 at step 526.

$$NR(i,j) = (F(i,j) * (COUNT(i,j) - 1) + ORIG(i,j))/COUNT(i,j) \qquad (4)$$

In equation (4), the original pixel value, ORIG, is added to the product of the motion compensated pixel value of forward prediction, F, and the value stored in the count memory minus 1, COUNT−1. This sum is divided by the value stored in the count memory, COUNT, and is set equal to the noise reduced pixel value, NR. If the mode is backward prediction, the noise reduced pixel value is set by equation (5), and the count is set equal to 2 at step 516. Since the count memory has a fixed word length, it is desirable to limit the maximum count value. In the exemplary embodiment of the invention, the count memory 40 is composed of eight-bit words. Accordingly, the maximum count value is 255. Calculated count values which are greater than 255 are set to 255 before they are stored into the memory 40. It is contemplated that other word sizes may be used. If, for example, a word size of four-bits were used, the maximum count value would be 15.

$$NR(i,j) = (ORIG(i,j) + B(i,j))/2 \qquad (5)$$

In equation (5), the original pixel value, ORIG, is added to the motion compensated pixel value of backward prediction, B. This sum is divided by 2 and is set equal to the noise reduced pixel value, NR. If the mode is bidirectional and the count equals 2 as determined by step 520, the noise reduced pixel value is set by equation (6) at step 524, and the count is incremented by 1 at step 526.

$$NR(i,j) = (F(i,j) + ORIG(i,j) + B(i,j))/3 \qquad (6)$$

In equation (6), the original pixel value, ORIG, is added to the motion compensated pixel values of forward prediction and backward prediction, F and B, respectively. This sum is divided by 3 and is set equal to the noise reduced pixel value, NR. If the mode is bidirectional and the count does not equal 2, the value is set by equation (7) at step 522, and the count is incremented by 1 at step 526.

$$NR(i,j) = ((F(i,j) * COUNT(i,j)) + ((ORIG(i,j) + B(i,j))/2))/(COUNT(i,j) + 1) \qquad (7)$$

In equation (7), the original pixel value, ORIG, is added to the motion compensated pixel value of backward prediction, B, and divided by 2. This value is then added to the product of the motion compensated pixel value of forward prediction, F, and the value stored in the count memory, COUNT. This sum is divided by the value stored in the count memory plus 1, COUNT +1, and is set equal to the noise reduced pixel value, NR. After the count memory 40 is set at step 528, and remaining pixels are processed at step 530, this noise reduced pixel value is received by the breakdown detector 60.

Figure 6:
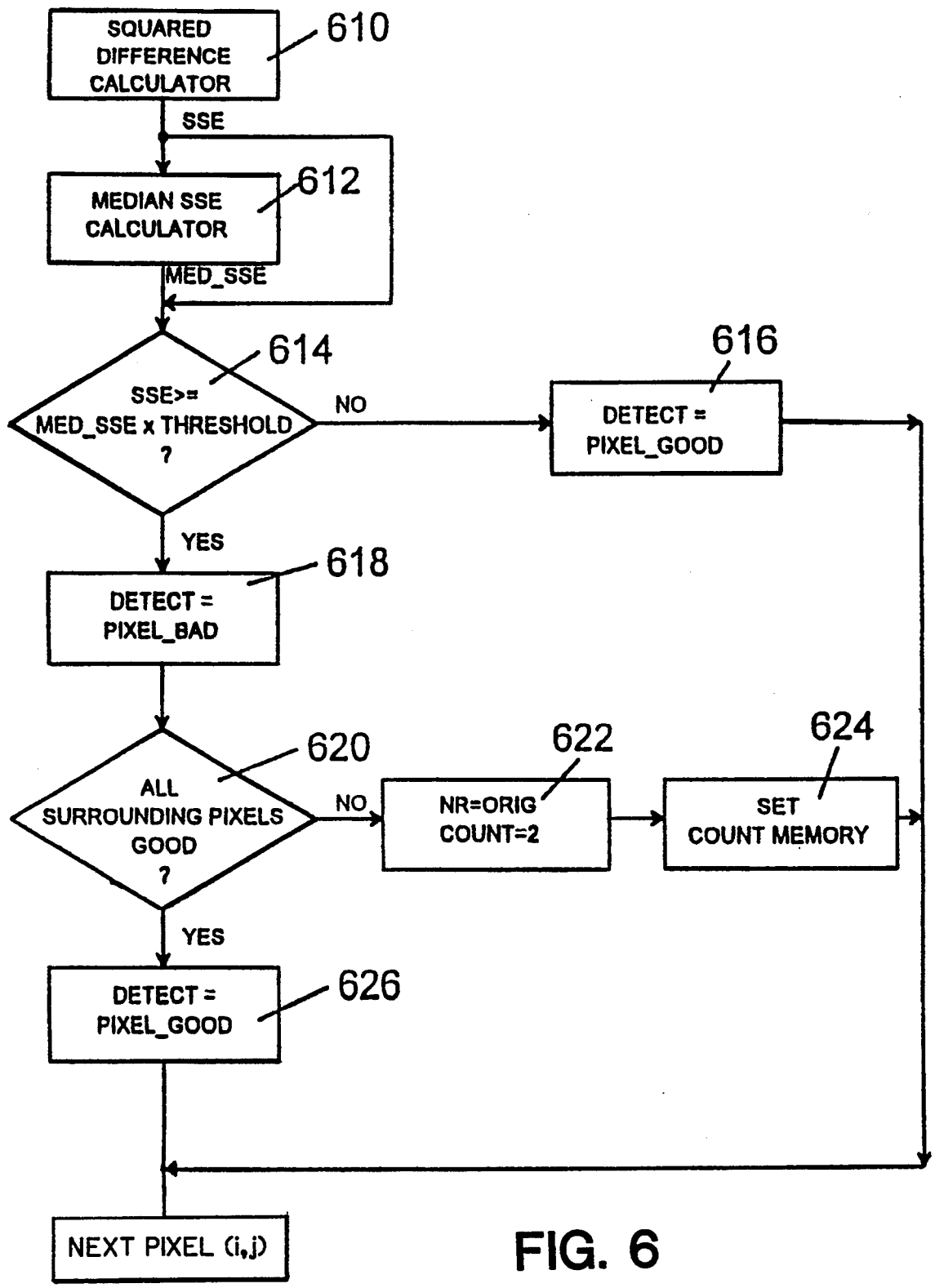
FIG. 6 is a flow diagram of circuitry for performing breakdown detection which is suitable for use with the system shown in FIG. 1.

FIG. 6 is a flow diagram of an exemplary breakdown detector 60 shown in FIG. 1. The pixel values which are generated by the noise reduction processor 50 and the pixel values from the original (not noise reduced) frame are received by the squared difference calculator at step 610. The difference between the original pixel value and the noise reduced pixel value is determined by an adder. The output of this adder is then squared. The output value provided by the square function, the value sse, is applied to step 614. Furthermore, a value med‑sse, provided by a median of squared difference calculator 612, is also applied to step 614. Median calculator 612 determines the median of all of the squared difference values provided by the squared difference calculator 610. In the exemplary embodiment of the invention, this median value is calculated over the entire image frame. It is contemplated, however, that other methods may be used to calculate the median value. For example, the calculations may be limited to the block containing the pixel, to a predetermined number of blocks surrounding the pixel or to blocks of pixels which occupy an area of known pixel values, for example, blocks occurring in a blanked area of the image.

Next, as shown in FIG. 6, the product of the output value med‑sse, provided by the median of the squared difference calculator 612, and the breakdown threshold value, t, is calculated at step 614. If the result of this multiplication is greater than the output value, sse, of the squared difference calculator 610, then the noise reduced pixel value is marked as GOOD at step 616 and is used as the noise reduced pixel value. Otherwise, the noise reduced pixel is marked as BAD at step 618 and the surrounding pixels are examined at step 620. Step 620 is used to reduce sparkle. Sparkle occurs when a pixel is not noise reduced, and all of its neighboring pixels are noise reduced. If the surrounding pixels have all been classified as GOOD, meaning the noise reduced pixel value was used as the final pixel value for each of the surrounding pixels, then the noise reduced value for the pixel in question is used as the final pixel value at step 626. Following step 626, the next pixel is selected for processing by the breakdown detector 60.

This is a method of sparkle reduction. If at least one of the surrounding pixels has not been classified as GOOD, then the original pixel value, and not the noise reduced pixel value, is used, at step 622, as the final pixel value for the pixel in question. Also, in this scenario, the count is reset to 2 and the count memory is set, at step 624, if the noise reduced pixel value is discarded. The value of the output pixels provided by the breakdown detector 60 are then stored into the frame memory.

By processing multiple frames of video information in the manner set forth above, noise may be substantially reduced even in images having large components in motion without sacrificing image resolution.

While the invention has been described in terms of an exemplary embodiment, it is contemplated that it may be practiced as outlined above with modifications within the spirit and scope of the appended claims.

What is claimed is:

1. Apparatus for reducing noise in an input video signal which includes a plurality of video frames, the apparatus comprising:
   processed frame memory means for storing a noise reduced image;
   motion estimator means for selecting a target block of image components in said frame memory to be used in calculating a noise reduced video signal; and
   motion compensated noise reduction means for calculating said noise reduced video signal by calculating a set of time-varying weighted filtering coefficients for the target block and for generating a motion block of noise reduced image components by averaging a plurality of image components in a current block selected from the video signal with respective image components of the target block as weighted by the coefficients.

2. Apparatus for reducing noise in an input video signal which includes a plurality of video frames, the apparatus comprising:
   processed frame memory means for storing a noise reduced image;
   motion estimator means for identifying a target block of image components in said frame memory to be used in calculating a noise reduced video signal;
   motion compensated noise reduction means for calculating said noise reduced video signal by calculating a set of time-varying weighted filtering coefficients for the target block and for generating a motion block of noise reduced image components by averaging a plurality of image components in a current block selected from the video signal with respective image components of the target block as weighted by the coefficients; and
   breakdown detection means for replacing each one image component of the current block with a corresponding noise-reduced image component of the motion block if a measure of noise reduction achieved for the one image component divided by a reference measure of noise is less than a threshold value.

3. Apparatus according to claim 2, further comprising sparkle reduction means for examining the current block to identify image components which have not been replaced by noise reduced image components and replacing the identified image components with corresponding noise reduced image components from the motion block if all of the image components which are adjacent to the identified image components have been replaced.

4. Apparatus according to claim 2, further comprising:
   count memory means such that a 1:1 correspondence exists between counts and image components in one frame of the plurality of frames, where each count indicates a number of image components corresponding to the count in the plurality of frames which were used to develop the noise reduced image component;
   wherein the motion compensated noise reduction means is responsive to the counts held in the count memory means and corresponding to the respective image components of the target block for calculating the set of time-varying weighted filtering coefficients for the target block.

5. Apparatus for reducing noise in an input video signal which includes a plurality of video frames, the apparatus comprising:
   processed frame memory means for storing a noise reduced image;
   motion estimator means for identifying a target block of image components in said frame memory to be used in calculating a noise reduced video signal;
   motion compensated noise reduction means for calculating said noise reduced video signal by calculating a set of time-varying weighted filtering coefficients for the target block and for generating a motion block of noise reduced image components by averaging a plurality of image components in a current block selected from the video signal with respective image components of the target block as weighted by the coefficients; and
   classification means for determining a measure of variation which occurs in the current block and for calculating a weighting value and a threshold value to be used by the motion estimator means.

6. Apparatus for reducing noise in an input video signal which includes a plurality of video frames, the apparatus comprising:
   processed frame memory means for storing a noise reduced image;
   motion estimator means for identifying a target block of image components in said frame memory to be used in calculating a noise reduced video signal;
   motion compensated noise reduction means for calculating said noise reduced video signal by calculating a set of time-varying weighted filtering coefficients for the target block and for generating a motion block of noise reduced image components by averaging a plurality of image components in a current block selected from the video signal with respective image components of the target block as weighted by the coefficients; and
   means for providing a plurality of trial velocity vectors to the motion estimator means for use in identifying the target block.

7. Apparatus for reducing noise in an input video signal which includes a plurality of video frames, the apparatus comprising:
   processed frame memory means for storing a noise reduced image;
   motion estimator means for identifying a target block of image components in said frame memory to be used in calculating a noise reduced video signal;
   motion compensated noise reduction means for calculating said noise reduced video signal by calculating a set of time-varying weighted filtering coefficients for the target block and for generating a motion block of noise reduced image components by averaging a plurality of image components in a current block selected from the video signal with respective image components of the target block as weighted by the coefficients; and
   future frame memory means for holding image components representing an image which is to be displayed following the current image, wherein the motion estimator means includes means for identifying a further block of image components in said future frame memory means and the motion compensated noise reduction means includes means for generating said motion block of image components by combining the current block of image components with at least one of the target block of image components and the further target block of image components.

8. A method of reducing noise in a video signal which includes a plurality of video frames, the method comprising the steps of:

storing a noise reduced image in processed frame memory;

selecting a target block of picture elements in said processed frame memory to be used in calculating a noise reduced video signal; and calculating said noise reduced video signal by combining the block of the noise reduced image pixels stored in the processed frame memory with a current block of pixels generated from the video signal and calculating a set of time-varying weighted filtering coefficients for the target block and for generating a motion block of noise reduced pixels by averaging the plurality of pixels in the block of noise reduced image pixels with respective pixels of the current block of pixels as weighted by the coefficients.

9. A method of reducing noise in a video signal which includes a plurality of video frames, the method comprising the steps of:

storing a noise reduced image in a processed frame memory;

identifying a target block of picture elements in said processed frame memory to be used in calculating a noise reduced video signal; and calculating said noise reduced video signal by combining the block of the noise reduced image pixels stored in the processed frame memory with a current block of pixels generated from the video signal and calculating a set of time-varying weighted filtering coefficients for the target block and for generating a motion block of noise reduced pixels by averaging the plurality of pixels in the block of noise reduced image pixels of the current block of pixels as weighted by the coefficients; and replacing each one of the pixels of the current block with a corresponding noise-reduced pixel from the motion block if a measure of noise reduction achieved for the one pixel divided by a measure of noise in the video signal is less than a threshold value.

10. A method according to claim 9 further comprising the step of examining the current block to identify pixels which have not been replaced by noise-reduced pixels and replacing the identified pixels with corresponding noise reduced pixels of the motion block if all of the image pixels which are adjacent to the identified pixels have been replaced.

11. A method according to claim 9 further comprising the step of determining a measure of the variation which occurs in the current block of pixels and for calculating a weighting value and a threshold value to be used in motion estimation and breakdown detection.

12. A method according to claim 11, wherein the step of determining a measure of variation occurring in the current block of pixels includes the step of identifying and counting image pixels which represent edges in the current block of pixels.

13. A method according to claim 9 further comprising the step of providing a plurality of trial velocity vectors to the motion estimator means for use in identifying the target block of pixels.

* * * * *

UNITED STATES PATENT AND TRADEMARK OFFICE
CERTIFICATE OF CORRECTION

PATENT NO.   : 5,442,407
DATED        : August 15, 1995
INVENTOR(S)  : Siu-Leong Iu It is certified that error appears in the above-identified patent and that said Letters Patent is hereby corrected as shown below:

On the Title page, column 1, [56] References Cited, change inventor's name for Patent No. 5,329,317 to Naimpally et al.

In cover sheet, column 2, Other Publications, under E. Dubois, after "Image" insert --Sequences--.

Column 11, line 14, claim 8, after "image in" insert an --a--.

Column 11, line 16, claim 8, after "elements" insert --(pixels)--.

Column 11, line 36, claim 9, after "elements" insert --(pixels)--.

Signed and Sealed this

Fifth Day of December, 1995

Attest:

BRUCE LEHMAN

*Attesting Officer*  *Commissioner of Patents and Trademarks*